US006907175B2

United States Patent
Suzuki et al.

(10) Patent No.: US 6,907,175 B2
(45) Date of Patent: Jun. 14, 2005

(54) COATED OPTICAL FIBER, OPTICAL FIBER TAPE CORE USING IT AND OPTICAL FIBER UNIT

(75) Inventors: Atsushi Suzuki, Yokohama (JP); Tomoyuki Hattori, Yokohama (JP); Toshifumi Hosoya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 215 days.

(21) Appl. No.: 10/416,027

(22) PCT Filed: Feb. 20, 2002

(86) PCT No.: PCT/JP02/01487

§ 371 (c)(1),
(2), (4) Date: May 7, 2003

(87) PCT Pub. No.: WO02/066390

PCT Pub. Date: Aug. 29, 2002

(65) Prior Publication Data

US 2004/0022510 A1 Feb. 5, 2004

(30) Foreign Application Priority Data

Feb. 20, 2001 (JP) .................................... 2001-043751

(51) Int. Cl.$^7$ ................................................ G02B 6/02
(52) U.S. Cl. ..................... 385/128; 385/126; 385/127
(58) Field of Search .............................. 385/128, 123, 385/125, 126, 127

(56) References Cited

U.S. PATENT DOCUMENTS 5,483,612 A    1/1996  Gallagher et al.
6,689,463 B2 *  2/2004  Chow et al. ............. 428/378

FOREIGN PATENT DOCUMENTS

| JP | 59-90803     | 5/1984  |
| JP | 61-200515    | 9/1986  |
| JP | 61-200516    | 9/1986  |
| JP | S63-43111    | 3/1988  |
| JP | HEI08-248250 | 9/1996  |
| JP | 11-311726    | 11/1999 |
| JP | 2001-004885 A| 1/2001  |
| JP | 2001-240433  | 9/2001  |

* cited by examiner

Primary Examiner—Rodney Bovernick
Assistant Examiner—Sung Pak
(74) Attorney, Agent, or Firm—McDermott Will & Emery LLP

(57) ABSTRACT

The present invention provides a coated optical fiber in which a silica type optical fiber is coated with n layers (n being an integer of 2 or greater) of UV-curable resin, wherein the sum of respective contraction stress indices FI defined in the n layers of UV-curable resin by the following expression: FI [N]=(Young's modulus [MPa] of the UV-curable resin layer at −40° C.)×(cross-sectional area [mm$^2$] of the UV-curable resin layer)×(effective linear expansion coefficient [10$^{-6}$/° C.]/10$^6$)×(temperature difference 190[° C.]) is 3 [N] or less. The present invention can sufficiently prevent transmission characteristics from deteriorating in a low temperature environment.

12 Claims, 6 Drawing Sheets

COATED OPTICAL FIBER, OPTICAL FIBER TAPE CORE USING IT AND OPTICAL FIBER UNIT

TECHNICAL FIELD

The present invention relates to a coated optical fiber, and a coated optical fiber ribbon and optical fiber unit using the same.

BACKGROUND ART

Coated optical fibers used in optical communications are generally made by coating optical fibers with a resin, whereas the resin usually constitutes two layers consisting of a primary coating layer as the inner layer and a secondary coating layer as the outer layer.

An example of such coated optical fibers is disclosed in Japanese Patent Application Laid-Open No. HEI 8-248250. The coated optical fiber disclosed in this publication uses a primary coating layer having a Young's modulus of 1.0 to 3.0 MPa and a glass transition point of −10° C. or lower, and a secondary coating layer having a Young's modulus of at least 400 MPa.

DISCLOSURE OF THE INVENTION

Meanwhile, coated optical fibers are used in submarine optical communications as well. Therefore, they have been desired to realize favorable transmission characteristics in a low temperature environment of 0 to 5° C., for example, and further at a low temperature of about −40° C. in view of such versatility as applicability to land communication networks.

The inventors studied the conventional coated optical fiber disclosed in the above-mentioned publication. As a result, it was found that there were cases where the conventional coated optical fiber disclosed in the above-mentioned publication deteriorated its transmission characteristics in a low temperature environment of 0 to 5° C. and, in particular, there were cases where it became hard to be put into practical use for optical communications in conformity to the wavelength division multiplexing (WDM) scheme in a low temperature environment.

Therefore, it is an object of the present invention to provide a coated optical fiber which can sufficiently prevent transmission characteristics from deteriorating in a low temperature environment, and a coated optical fiber ribbon and optical fiber unit using the same.

The inventors conducted diligent studies in order to solve the above-mentioned problem and, as a result, have found that a coated optical fiber formed by coating a silica type glass optical fiber with n layers of UV-curable resin can fully prevent transmission characteristics from deteriorating at a low temperature when the sum of contraction stress indices FI defined according to the Young's modulus at −40° C., cross-sectional area, effective linear expansion coefficient, and the like of each layer becomes a predetermined value or lower, thereby accomplishing the present invention.

That is, the present invention provides a coated optical fiber in which a silica type optical fiber is coated with n layers (n being an integer of 2 or greater) of UV-curable resins, wherein the sum of respective contraction stress indices FI defined in the n layers of UV-curable resin by the following expression:

FI [N]=(Young's modulus [MPa] of the UV-curable resin layer at −40° C.)×(cross-sectional area [mm²] of the UV-curable resin layer)×(effective linear expansion coefficient [10⁻⁶/° C.]/10⁶)× (temperature difference 190[° C.])

is 3 [N] or less.

Also, the present invention provides a coated optical fiber ribbon comprising a plurality of such coated optical fibers. Further, the present invention provides an optical fiber unit comprising a central tension member and a plurality of coated optical fibers disposed about the central tension member, each of the plurality of coated optical fibers being the above-mentioned coated optical fiber.

They can fully prevent transmission loss from deteriorating at a low temperature, since they contain a coated optical fiber which can fully prevent transmission loss from deteriorating at a low temperature.

BEST MODES FOR CARRYING OUT THE INVENTION

In the following, embodiments of the present invention will be explained.

First, the coated optical fiber in accordance with the present invention will be explained.

Figure 1A:
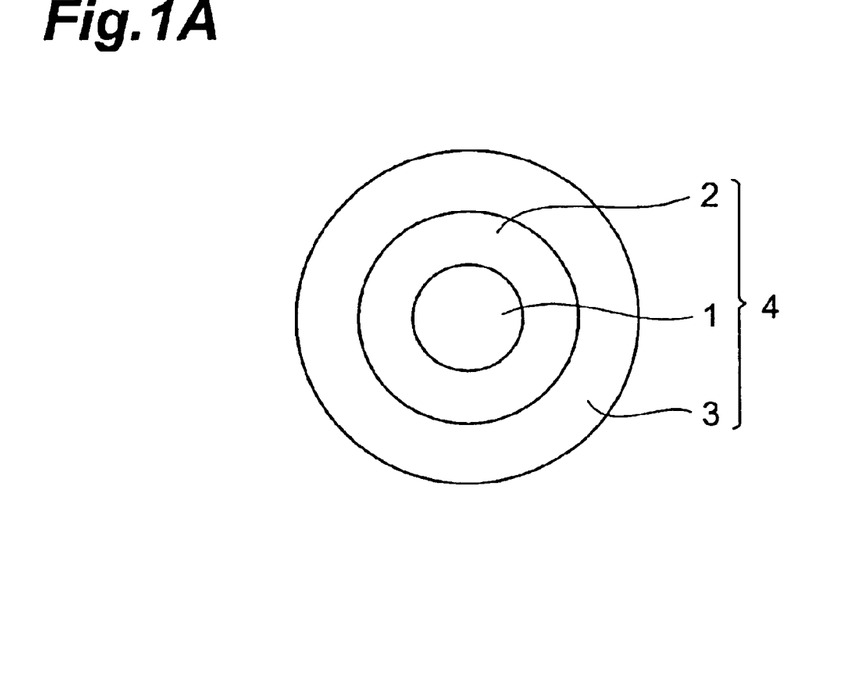
FIG. 1A is an end face view showing an embodiment of the coated optical fiber in accordance with the present invention.

The coated optical fiber of the present invention is one obtained by coating a silica type glass optical fiber with n layers of UV-curable resin. Here, n is an integer of 2 or greater, which is usually 2 or 3. FIG. 1A shows a coated optical fiber formed by coating the outer periphery of a silica type glass optical fiber 1 with two layers of UV-curable resin 2, 3, i.e., a coated optical fiber 4 whose n is 2.

Though the silica type glass optical fiber used in the coated optical fiber of the present invention may have any refractive index distribution such as stepped index form as long as it is a single-mode optical fiber, it is preferably an optical fiber having such a refractive index distribution that the dispersion at a wavelength of about 1.55 μm becomes zero, i.e., dispersion-shifted fiber, preferably an NZ-type chromatic-dispersion-shifted fiber (nonzero-dispersion-shifted fiber) in particular, while its effective core area ($A_{eff}$) is preferably at least 60 μm². The effective core area ($A_{eff}$) is set to at least 60 μm², since noise tends to occur due to nonlinear phenomena when the effective core area is less than 60 μm². On the other hand, the effective core area is preferably not greater than 130 μm². When the effective core area exceeds 130 μm², transmission characteristics become so sensitive to the bending of fiber that loss tends to increase.

Another example of the silica type glass optical fiber usable in the coated optical fiber of the present invention is a negative dispersion fiber.

Preferably, in the negative dispersion fiber, the ratio (S/D) between the chromatic dispersion D and dispersion slope S at a given wavelength within the wavelength range of 1.52 to 1.62 $\mu$m is 0.001 to 0.004 (1/nm). When the above-mentioned negative dispersion fiber is connected to a standard single-mode optical fiber (an optical fiber whose dispersion becomes zero in the vicinity of a wavelength of 1.3 $\mu$m), and they are used as an optical transmission line between a light source and a photodetector, the above-mentioned negative dispersion fiber can compensate for the dispersion and dispersion slope of the standard single-mode optical fiber.

Preferably, in the negative dispersion fiber, the ratio (S/D) between the chromatic dispersion D and dispersion slope S at a given wavelength within the wavelength range of 1.52 to 1.62 $\mu$m is 0.004 to 0.020 (1/nm). When the above-mentioned negative dispersion fiber is connected to a nonzero-dispersion-shifted optical fiber, and they are used as an optical transmission line between a light source and a photodetector, the above-mentioned negative dispersion fiber can compensate for the dispersion and dispersion slope of the nonzero-dispersion-shifted optical fiber.

The above-mentioned dispersion-shifted optical fiber and negative dispersion fiber can be obtained, for example, by appropriately using germania ($GeO_2$), which increases the refractive index, and fluorine, which decreases the refractive index, so as to form a suitable refractive index distribution form.

The outer diameter of the silica type optical fiber used in the coated optical fiber in accordance with the present invention is usually 115 to 135 $\mu$m, preferably 124 to 126 $\mu$m.

In the coated optical fiber of the present invention, the sum of respective contraction stress indices FI in the n layers of UV-curable resin is 3 [N] or less. Here, the contraction stress index FI is defined by the following expression:

*FI* [N]=(Young's modulus [MPa] of the UV-curable resin layer at −40° C.)×(cross-sectional area [mm$^2$] of the UV-curable resin layer)×(effective linear expansion coefficient [10$^{-6}$/° C.)/10$^6$)× (temperature difference 190[° C.]) (1)

In the above-mentioned expression, the effective linear expansion coefficient takes account of not only the linear contraction caused by temperature changes, but also the hardening shrinkage upon curing. When a UV-curable resin composition cures within a UV irradiating apparatus, the UV-curable resin layer is at a high temperature of at least 100° C. due to the radiant heat from a UV lamp and the heat of curing reaction of the UV-curable resin composition itself. Therefore, if temperature decreases after the optical fiber exits the UV irradiating apparatus, the UV-curable resin layer contracts in conformity to its linear expansion coefficient. However, the hardening shrinkage also occurs with the curing reaction. Therefore, after the coating with the UV-curable resin composition, the outer diameter immediately prior to curing shrinks not only by the linear expansion coefficient but also by the hardening shrinkage ratio in practice. In the expression of FI, the temperature difference can be represented by 190° C. (difference between −40° C. and 150° C.). Consequently, the effective linear expansion coefficient is specifically represented by the following expression:

$\alpha_{\mathit{eff}}$[10$^{-6}$/° C.]={average linear expansion coefficient ($\alpha_a$[10$^{-6}$/° C.] from −40° C. to 150° C.}+{shrinkage ratio (linear shrinkage ratio) s' caused by hardening shrinkage [10$^{-6}$/° C.]/190× 10$^6$} (1)

Here, the linear shrinkage ratio s' is represented by the following expression:

$$s'=\{1-(1-s)^{1/3}\} \quad (2)$$

where s indicates the hardening shrinkage ratio. The hardening shrinkage ratio s is represented by the following expression:

$$s=(\rho_a-\rho_b)/\rho_b \quad (3)$$

where $\rho_b$ is the specific gravity of the coating layer before curing, and $\rho_a$ is the specific gravity of the coating layer after curing.

When the sum of respective contraction stress indices FI in n layers of UV-curable resin exceeds 3 [N], transmission characteristics in a low temperature environment deteriorate. The lower limit of the sum of contraction stress indices FI is preferably 0.6 N.

Among n layers of UV-curable resin, the Young's modulus of the first UV-curable resin layer in close contact with the silica type glass optical fiber is preferably 0.7 MPa or less, more preferably 0.5 MPa or less, at 23° C. If the Young's modulus exceeds 0.7 MPa, a strain-alleviating effect may not be exhibited when the coated optical fiber incurs a strain, whereby transmission loss tends to increase. The Young's modulus of the first UV-curable resin layer at 23° C. is preferably at least 0.1 MPa, more preferably at least 0.3 MPa. If the Young's modulus is less than 0.1 MPa, the breaking strength of the first UV-curable resin layer may be so low that the first UV-curable resin layer tends to break (fracture) due to the strain applied to the coating during the making of the coated optical fiber.

Here, the Young's modulus of a UV-curable resin layer is measured as follows: Namely, a sheet-like UV-curable resin layer is formed from the same material as that of the UV-curable resin layer used for the coated optical fiber, and then is subjected to a tension test. As a consequence, the Young's modulus of the UV-curable resin layer is measured.

In the coated optical fiber of the present invention, the adhesive force between the first UV-curable resin layer in n layers of UV-curable resin and the silica type glass is preferably 50 to 200 N/m, more preferably 70 to 150 N/m. When the adhesive force is less than 50 N/m, the adhesive force may be insufficient, whereby the probability of transmission loss increasing at a low temperature due to the first UV-curable resin layer peeling off from the silica type glass optical fiber tends to become greater. Also, in this case, the first UV-curable resin layer 2 tends to peel off from the glass optical fiber 1 as the force by which the coated optical fiber 24 is pressed against a swinging roller, which will be explained later, increases. On the other hand, the operation for removing the UV-curable resin layer tends to become difficult when connecting coated optical fibers if the adhesive force exceeds 200 N/m.

The breaking strength of the first UV-curable resin layer 2 in n layers of UV-curable resin is preferably at least 1.8 MPa. In this case, when the coated optical fiber incurs a strain, voids can sufficiently be prevented from occurring due to the deconstruction within the UV-curable resin layers, whereby the provability of transmission loss increasing at a low temperature due to the occurrence of voids can fully be suppressed. The upper limit of the breaking strength is preferably 100 MPa. When the breaking strength exceeds 100 MPa, the operation for removing the coating tends to become difficult.

Preferably, in the case where n is 3, i.e., there are three layers of UV-curable resin, the Young's modulus of the second UV-curable resin layer 3 at 23° C. is 150 to 1000 MPa, whereas the Young's modulus of the third UV-curable resin layer at 23° C. is greater than 1000 MPa but not more than 1500 MPa. In this case, microbending is further improved, whereby fractures are sufficiently prevented from occurring due to external damages.

Figure 1B:
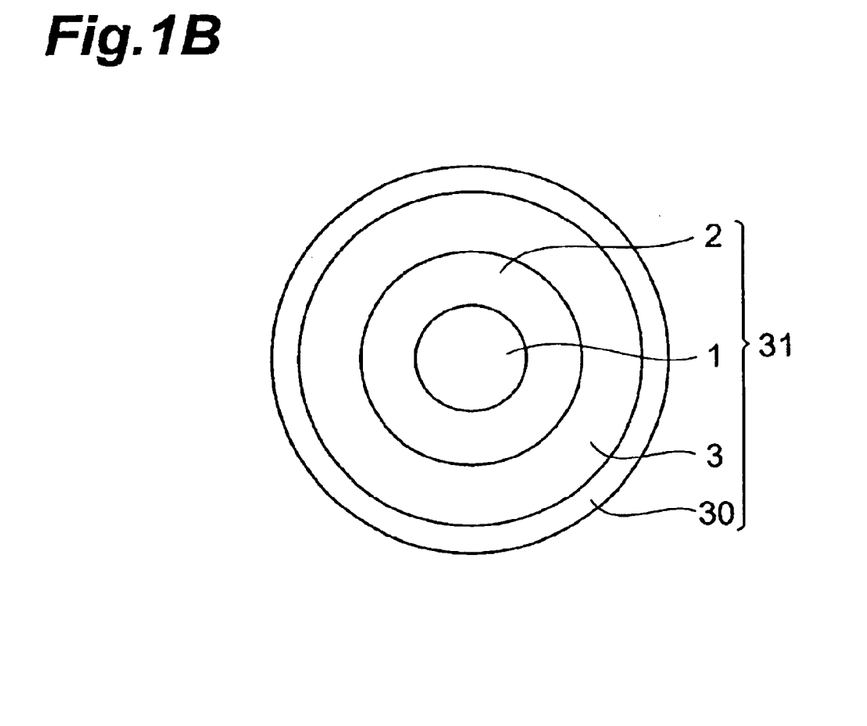
FIG. 1B is an end face view showing another embodiment of the coated optical fiber in accordance with the present invention.

As shown in FIG. 1B, the coated optical fiber in accordance with the present invention may be one in which n layers of UV-curable resin 2, 3 are coated with a coloring layer 30. The coloring layer 30 is used for identifying the coated optical fiber 31, and is not restricted in particular as long as it is colored. The coloring layer 30 is constituted by a UV-curable resin with a pigment added thereto.

The UV-curable resin layers are formed by irradiating with UV rays a resin composition adapted to cure upon UV irradiation. The resin composition contains, for example, not only polyether urethane acrylate type resins and the like, but also diluent resins for diluting the former resins. The resin composition may further contain photopolymerization initiators, silane coupling agents, polar monomers, monomers having a heterocycle, monomers having a multi-membered ring, and the like when necessary.

For example, a polymerizable oligomer synthesized from 2-hydroxyethyl acrylate, 2,4-tolylene diisocyanate, and polypropylene glycol; a polymerizable oligomer synthesized from 2-hydroxyethyl acrylate, 2,4-tolylene diisocyanate, ethylene oxide, and tetrahydrofuran; a polymerizable oligomer synthesized from 2-hydroxyethyl acrylate, 2,4-tolylene diisocyanate, and polytetramethylene glycol; or the like is used as the polyurethane acrylate type resin.

The diluent monomers are not restricted in particular as long as they can dissolve the polyether urethane acrylate type resins and the like. Examples of the diluent monomers include monofunctional diluent monomers such as N-vinylpyrrolidone and N-vinylcaprolactam; multifunctional diluent monomers such as trimethylolpropane tri(meth)acrylate and ethylene glycol di(meth)acrylate; and the like. The diluent monomer may be a mixture of a monofunctional diluent monomer and a multifunctional diluent monomer. Examples of the photopolymerization initiators include benzyldimethylketal, benzoin ethylether, 4-chlorobenzophenone, 3-methylacetophenone, 2,4,6-trimethylbenzoyldiphenylphosphinoxide, thioxanthone, and the like. Examples of the silane coupling agents include γ-mercaptopropyltrimethoxysilane and the like. Examples of the polar monomers include acrylamide, N-vinylpyrrolidone, acryloylmorpholine, and the like. An example of the heterocycle is lactam, whereas an example of the monomers having a heterocycle is N-vinylcaprolactam. An example of the monomers having a multi-membered ring is isobornyl acrylate.

Preferably, the first layer resin composition 7a contains an oligomer having a molecular weight of at least 5000, a multifunctional monomer having a methylene group with a carbon number of 5 to 11, and a monomer having the above-mentioned heterocycle and/or a monomer having the above-mentioned multi-membered ring, wherein the multifunctional monomer has a weight ratio of 0.02 to 0.04 with respect to the oligomer.

When the molecular weight of the oligomer is less than 5000, the Young's modulus of the first UV-curable resin tends to become higher. Preferably, the molecular weight of the oligomer is 30,000 or less. When the molecular weight exceeds 30,000, the resulting composition yields such a high viscosity that it tends to become hard to handle. An example of the oligomer is polyether diol.

When the carbon number of methylene group in the multifunctional monomer is less than 5, the Young's modulus of the first UV-curable resin layer may be so high that it tends to become hard to reduce the microbending loss and remove coatings. When the carbon number of the methylene group exceeds 11, on the other hand, the breaking strength of the first UV-curable resin layer may be so low that voids are likely to occur in the first UV-curable resin layer. An example of the multifunctional monomer is nonanediol diacrylate.

When the weight ratio of the multifunctional monomer with respect to the oligomer is less than 0.02, the breaking strength of the first UV-curable resin layer may be so low that voids are likely to occur in the first UV-curable resin layer. When it exceeds 0.04, on the other hand, the Young's modulus of the first UV-curable resin layer may be so high that it tends to become hard to reduce the microbending loss and remove coatings.

The first layer resin composition 7a may further contain aliphatic monomers.

Preferably, the breaking strength of the first UV-curable resin layer obtained by curing the first layer resin composition 7a is at least 4.0 MPa. When the breaking strength is less than 4.0 MPa, voids tend to occur in the first UV-curable resin layer.

The Young's modulus and breaking strength of a UV-curable resin layer are adjusted as follows: That is, for lowering the Young's modulus and breaking strength of the UV-curable resin layer, it will be sufficient if the molecular weight of the polyether part of the polyether urethane acrylate type resin is increased, or if a linear monofunctional diluent monomer having a large molecular weight is used.

For increasing the Young's modulus and breaking strength, on the other hand, it will be sufficient if the molecular weight of the polyether urethane acrylate type resin is reduced, or if the rigidity of its urethane part is raised. Alternatively, it will be sufficient if the multifunctional diluent monomer is used as a diluent monomer and its compounding amount in the resin composition is increased, or if a monomer having a high rigidity is used as a diluent monomer.

The adhesive force between the silica type glass and the first UV-curable resin layer can be adjusted by regulating the amount of addition of the polar monomer or silane coupling agent used in the first UV-curable resin layer.

The linear expansion coefficient can be adjusted as follows: That is, the expansion at a high temperature can be reduced by decreasing the urethane bonds in the polyether urethane acrylate type resin, whereby the average linear expansion coefficient $\alpha_a$ from −40 to 150° C. can be lowered. Also, when a polyether urethane acrylate type resin containing a large portion of a highly rigid part (benzene ring or the like) is used, the linear expansion coefficient can be lowered over the whole range of −40 to 150° C.

An example of the method of making a coated optical fiber in accordance with the present invention will now be explained.

First, the configuration of a drawing apparatus for carrying out the method of making the coated optical fiber in accordance with the present invention will be explained.

Figure 2:
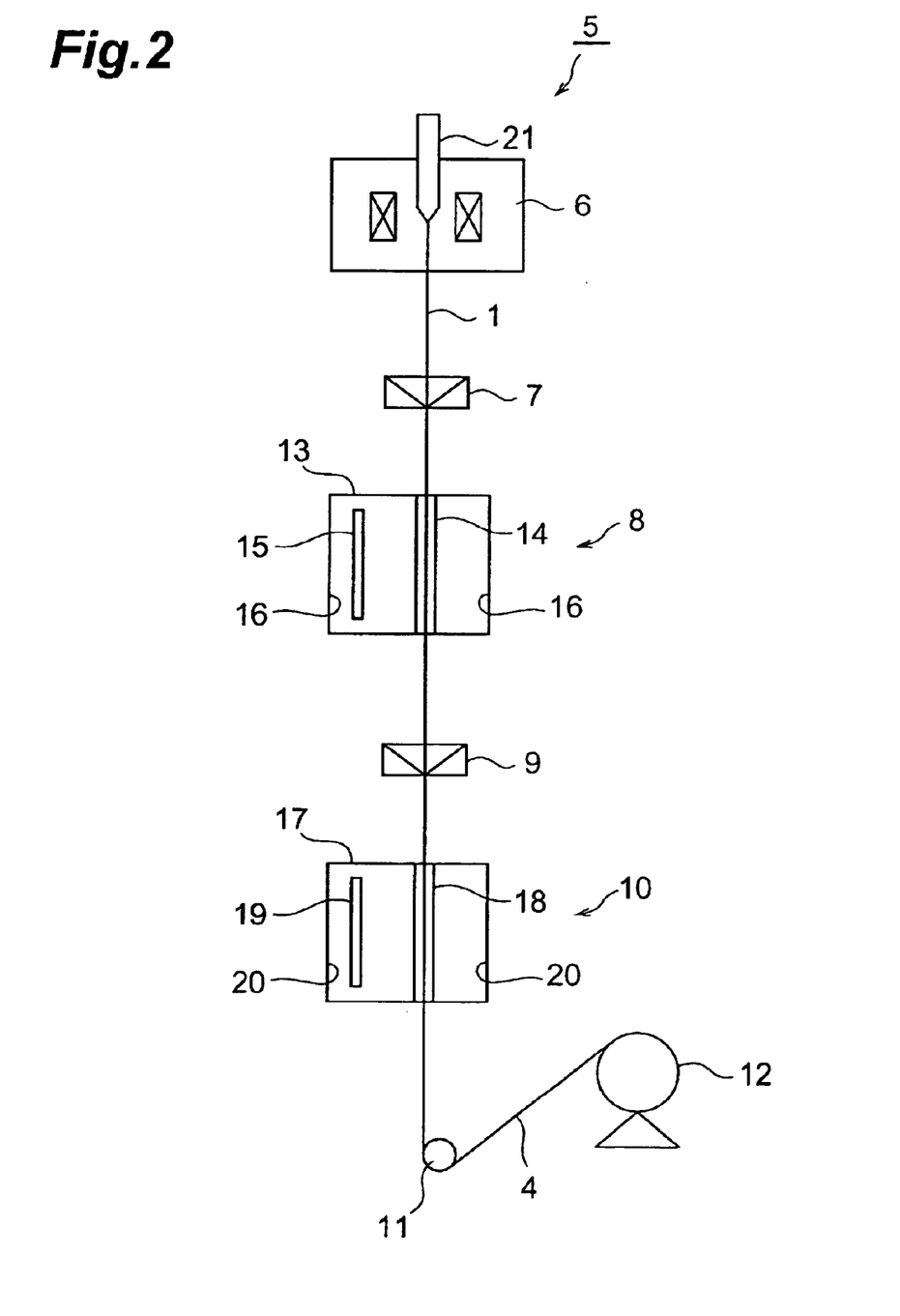
FIG. 2 is a schematic view showing an example of drawing apparatus for making the coated optical fiber in accordance with the present invention.

FIG. 2 is a schematic view showing an example of drawing apparatus for making the coated optical fiber in accordance with the present invention. As shown in FIG. 2, a drawing apparatus 5 comprises a drawing furnace 6 and, successively arranged in the vertical direction from thereunder, a die 7 containing the first layer resin composition, a first UV irradiating unit 8, a die 9 containing the second layer resin composition, a second UV-irradiating unit 10, and a bottom roller 11. The first UV irradiating unit 8 comprises a housing 13, whereas a cylindrical silica glass tube 14 for passing therethrough an optical fiber coated with the first layer resin composition is provided in the housing 13. A UV lamp 15 is disposed outside the glass tube 14 within the housing 13, whereas a reflector 16 is attached to the inside of the housing 13. As with the first UV irradiating unit 8, the second UV irradiating unit 10 comprises a housing 17, a cylindrical silica glass tube 18, a UV lamp 19, and a reflector 20. The drawing apparatus 5 further comprises a winder 12, disposed near the bottom roller 11, for taking up the coated optical fiber 4.

For making the coated optical fiber 4 in such a drawing apparatus 5, a columnar optical fiber preform 21 based on silica type glass is initially prepared. The optical fiber preform 21 comprises a core part to become a core of an optical fiber, and a cladding part, disposed at the outer periphery of the core part, to become a cladding of the optical fiber.

The optical fiber preform 21 is passed through the drawing furnace 6, so as to melt its front end, thereby yielding an optical fiber 1. This optical fiber 1 is passed through the die 7 containing the first layer resin composition, where the optical fiber 1 is coated with the first layer resin composition. The optical fiber 1 coated with the first layer resin composition is irradiated with UV rays by the first UV irradiating unit 8, so as to cure the first layer resin composition, thereby coating the optical fiber 1 with the first UV-curable resin layer.

The optical fiber coated with the first UV-curable resin layer is passed through the die 9 containing the second layer resin composition, where the second layer resin composition is applied onto the first UV-curable resin layer. The optical fiber coated with the second layer resin composition is irradiated with UV rays by the second UV irradiating unit 10, so as to cure the second layer resin composition, thereby coating the first UV-curable resin layer with the second UV-curable resin layer.

This yields the coated optical fiber 4, which is then taken up by the winder 12 by way of the bottom roller 11.

Though a case with two UV-curable resin layers is explained here by way of example, the coated optical fiber in accordance with the present invention may have three or more layers.

Figure 3:
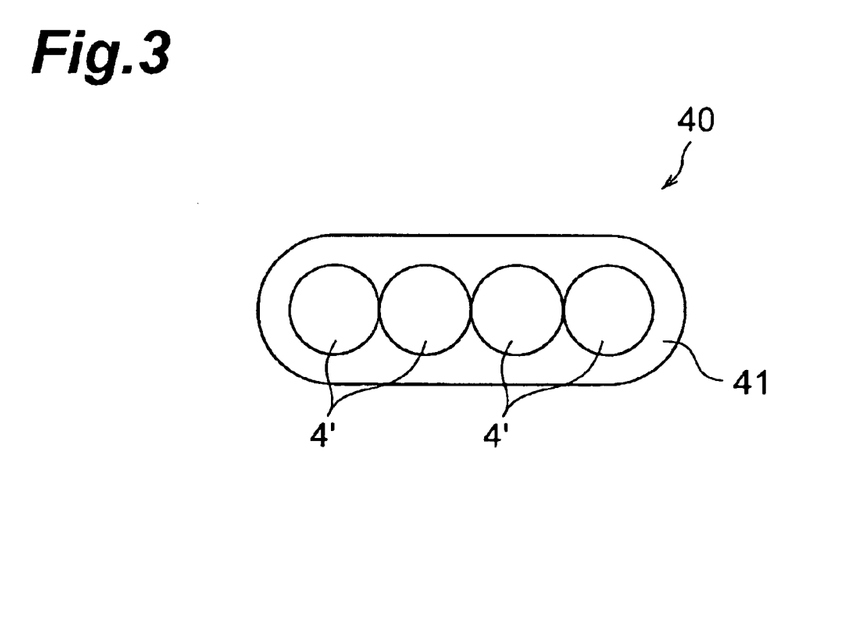
FIG. 3 is an end face view showing an embodiment of the coated optical fiber ribbon in accordance with the present invention.

FIG. 3 is a sectional view showing an embodiment of the coated optical fiber ribbon in accordance with the present invention. As shown in FIG. 3, the coated optical fiber ribbon 40 in accordance with this embodiment is one in which a plurality of coated optical fibers 4' each having a UV-curable resin layer coated with a coloring layer are arranged in parallel in a tape-like coating layer 41. This coated optical fiber ribbon 40 can be obtained by arranging a plurality of coated optical fibers 4' in parallel, coating them in this state with a resin composition adapted to cure upon UV irradiation, for example, and irradiating the composition with UV rays so as to cure the former, thereby forming the coating layer 41.

Figure 4:
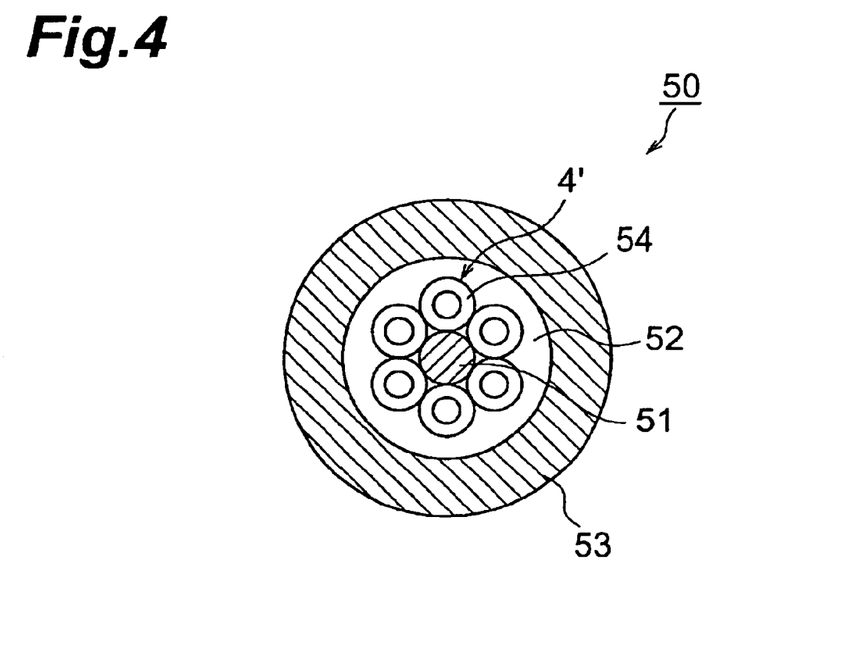
FIG. 4 is a sectional view showing an embodiment of the optical fiber unit in accordance with the present invention.

FIG. 4 is a sectional view showing an example of the optical fiber unit in accordance with the present invention. As shown in FIG. 4, the optical fiber unit 50 in accordance with this embodiment comprises a central tension member 51 made of steel or the like, and a plurality of coated optical fibers 4' arranged about the central tension member 51, whereas the surroundings of the coated optical fibers 4' area successively coated with a first UV-curable resin layer 52 and a second UV-curable resin layer 53. As shown in FIG. 4, a plurality of coated optical fibers 4' may be provided with respective coloring layers 54 so as to be discernible from each other.

The details of the present invention will now be explained specifically with reference to Examples, which will not restrict the present invention.

EXAMPLES 1 TO 8

(Making of Coated Optical Fiber)

Using the drawing apparatus 5 shown in FIG. 2, the coated optical fiber 4 was prepared as follows: First, the front end of the optical fiber preform 1 was inserted in the drawing furnace 6 heated at 1950° C., so as to be drawn upon melting, thus yielding a dispersion-shifted optical fiber 1 having a double core type refractive index profile, an effective core area of 85 $\mu m^2$, and an outer diameter of 125 $\mu m$. Thus obtained product was passed through the die 7 containing the first layer resin composition, so as to be coated with the first layer resin composition, which was then irradiated with UV rays by the first UV irradiating unit 8, so as to be cured. Thus, the first UV-curable resin layer was formed on the optical fiber 1. As the first layer resin composition, those listed in Table 1 were used. As the UV lamp, a metal halide lamp was used.

TABLE 1

| Example | Layer | Resin composition | Inner diameter [mm] | Outer diameter [mm] | Cross-sectional area [mm²] | Young's modulus 23° C. [MPa] | Young's modulus −40° C. [MPa] | Average linear expansion coefficient $\alpha_a$ (150~ −40° C.) [$10^{-6}$/° C.] | Hardening shrinkage ratio s[−] | Linear shrinkage ratio s'[−] | Effective linear expansion coefficient $\alpha_{eff}$ (150~ −40°) [$10^{-6}$/° C.] | Contraction stress index FI [N] | Total FI [N] |
|---|---|---|---|---|---|---|---|---|---|---|---|---|---|
| Example 1 | 1 | Rs2-1 | 0.125 | 0.200 | 0.0191 | 0.7 | 60 | 610 | 0.031 | 0.0104 | 665 | 0.15 | 1.9 |
|  | 2 | Rh2 | 0.200 | 0.245 | 0.0157 | 1000 | 2000 | 200 | 0.055 | 0.0187 | 298 | 1.78 |  |
| Example 2 | 1 | Rs2-2 | 0.125 | 0.200 | 0.0191 | 0.7 | 60 | 610 | 0.031 | 0.0104 | 665 | 0.15 | 1.9 |
|  | 2 | Rh2 | 0.200 | 0.245 | 0.0157 | 1000 | 2000 | 200 | 0.055 | 0.0187 | 298 | 1.78 |  |
| Example 3 | 1 | Rs2-3 | 0.125 | 0.200 | 0.0191 | 0.6 | 59 | 610 | 0.031 | 0.0104 | 665 | 0.14 | 1.9 |
|  | 2 | Rh2 | 0.200 | 0.245 | 0.0157 | 1000 | 2000 | 200 | 0.055 | 0.0187 | 298 | 1.78 |  |
| Example 4 | 1 | Rs2-4 | 0.125 | 0.200 | 0.0191 | 0.6 | 58 | 600 | 0.031 | 0.0104 | 665 | 0.14 | 1.9 |
|  | 2 | Rh2 | 0.200 | 0.245 | 0.0157 | 1000 | 2000 | 200 | 0.055 | 0.0187 | 298 | 1.78 |  |
| Example 5 | 1 | Rs2-5 | 0.125 | 0.200 | 0.0191 | 0.7 | 60 | 610 | 0.031 | 0.0104 | 665 | 0.15 | 1.9 |
|  | 2 | Rh2 | 0.200 | 0.245 | 0.0157 | 1000 | 2000 | 200 | 0.055 | 0.0187 | 298 | 1.78 |  |
| Example 6 | 1 | Rs2-6 | 0.125 | 0.200 | 0.0191 | 0.7 | 60 | 610 | 0.031 | 0.0104 | 665 | 0.15 | 1.9 |
|  | 2 | Rh2 | 0.200 | 0.245 | 0.0157 | 1000 | 2000 | 200 | 0.055 | 0.0187 | 298 | 1.78 |  |
| Example 7 | 1 | Rs2-1 | 0.125 | 0.210 | 0.0224 | 0.7 | 60 | 610 | 0.031 | 0.0104 | 665 | 0.17 | 1.6 |
|  | 2 | Rh2 | 0.210 | 0.245 | 0.0125 | 1000 | 2000 | 200 | 0.055 | 0.0187 | 298 | 1.42 |  |
| Example 8 | 1 | Rs2-1 | 0.125 | 0.180 | 0.0132 | 0.7 | 60 | 610 | 0.031 | 0.0104 | 665 | 0.10 | 2.6 |
|  | 2 | Rh2 | 0.180 | 0.245 | 0.0217 | 1000 | 2000 | 200 | 0.055 | 0.0187 | 298 | 2.46 |  |

Subsequently, the optical fiber formed with the first UV-curable resin layer was passed through the die 9 containing the second layer resin composition, so as to be coated with the second layer resin composition, which was then irradiated with UV rays in the second UV irradiating unit 10, so as to be cured. Thus, the second UV-curable resin layer was formed on the first UV-curable resin layer, whereby the coated optical fiber 4 was obtained. As the second resin layer composition, those listed in Table 1 were used. The first and second layer resin compositions were constituted as shown in Tables 2 and 3.

TABLE 2

| Resin | Polyether urethane acrylate | Amount (wt %) | Monomer | Amount (wt %) | Photoinitiator | Amount (wt %) | Silane coupling agent | Amount (wt %) |
|---|---|---|---|---|---|---|---|---|
| Rs1 | polymerizable oligomer synthesized from 2-hydroxyethyl acrylate, 2,4-tolylene diisocyanate, and polypropylene glycol | 60 | N-vinylpyrrolidone<br>isobornyl acrylate<br>nonylphenol EO-modified* (4-mole-modified)acrylate | 7<br>15<br>15 | 2,4,6-trimethyl benzoyldiphenyl phosphinoxide | 2 | γ-mercapto propyltrimethoxysilane | 1 |
| Rs2-1 | polymerizable oligomer synthesized from 2-hydroxyethyl acrylate, 2,4-tolylene diisocyanate, ethylene oxide, and tetrahydrofuran | 60 | lauryl acrylate<br>nonylphenol EO-modified (4-mole-modified)acrylate<br>N-vinylcaprolactam<br>triethylene glycol diacrylate | 10<br>16<br>5<br>4 | 2,4,6-trimethyl benzoyldiphenyl phosphinoxide | 2 | γ-mercapto propyltrimethoxysilane | 3 |
| Rs2-2 | polymerizable oligomer synthesized from 2-hydroxyethyl acrylate, 2,4-tolylene diisocyanate, ethylene oxide, and tetrahydrofuran | 60 | lauryl acrylate<br>nonylphenol EO-modified (4-mole-modified)acrylate<br>N-vinylcaprolactam<br>triethylene glycol diacrylate | 12<br>16<br>5<br>2 | 2,4,6-trimethyl benzoyldiphenyl phosphinoxide | 2 | γ-mercapto propyltrimethoxysilane | 3 |
| Rs2-3 | polymerizable oligomer synthesized from 2-hydroxyethyl acrylate, 2,4-tolylene diisocyanate, ethylene oxide, and tetrahydrofuran | 60 | lauryl acrylate<br>nonylphenol EO-modified (4-mole-modified)acrylate<br>N-vinylcaprolactam<br>triethylene glycol diacrylate | 12<br>17<br>5<br>1 | 2,4,6-trimethyl benzoyldiphenyl phosphinoxide | 2 | γ-mercapto propyltrimethoxysilane | 3 |
| Rs2-4 | polymerizable oligomer synthesized from 2-hydroxyethyl acrylate, 2,4-tolylene diisocyanate, ethylene oxide, and tetrahydrofuran | 60 | lauryl acrylate<br>nonylphenol EO-modified (4-mole-modified)acrylate<br>N-vinylcaprolactam<br>triethylene glycol diacrylate | 11<br>16<br>5<br>2 | 2,4,6-trimethyl benzoyldiphenyl phosphinoxide | 2 | γ-mercapto propyltrimethoxysilane | 4 |
| Rs2-5 | polymerizable oligomer synthesized from 2-hydroxyethyl acrylate, 2,4-tolylene diisocyanate, ethylene oxide, and tetrahydrofuran | 60 | lauryl acrylate<br>nonylphenol EO-modified (4-mole-modified)acrylate<br>N-vinylcaprolactam<br>triethylene glycol diacrylate | 13<br>16<br>5<br>2 | 2,4,6-trimethyl benzoyldiphenyl phosphinoxide | 2 | γ-mercapto propyltrimethoxysilane | 2 |

TABLE 3

| Resin | Polyether urethane acrylate | Amount (wt %) | Monomer | Amount (wt %) | Photoinitiator | Amount (wt %) | Silane coupling agent | Amount (wt %) |
|---|---|---|---|---|---|---|---|---|
| Rs2-6 | " | 60 | lauryl acrylate<br>nonylphenol EO-modified* (4-mole-modified) acrylate<br>N-vinylcaprolactam<br>triethylene glycol diacrylate | 14<br>16<br>5<br>2 | " | 2 | " | 1 |
| Rs3 | " | 70 | lauryl acrylate<br>nonylphenol EO-modified* (4-mole-modified) acrylate<br>N-vinylcaprolactam<br>triethylene glycol diacrylate | 8<br>10<br>5<br>4 | " | 2 | " | 1 |
| Rh1 | polymerizable oligomer synthesized from 2-hydroxyethyl acrylate, 2,4-tolylene diisocyanate, and polytetramethylene glycol | 55 | lauryl acrylate<br>N-vinylcaprolactam<br>ethylene glycol diacrylate | 13<br>15<br>15 | " | 2 | | |

TABLE 3-continued

| Resin | Polyether urethane acrylate | Amount (wt %) | Monomer | Amount (wt %) | Photoinitiator | Amount (wt %) | Silane coupling agent | Amount (wt %) |
|---|---|---|---|---|---|---|---|---|
| Rh2 | polymerizable oligomer synthesized from 2-hydroxyethyl acrylate, 2,4-tolylene diisocyanate, and polytetramethylene glycol | 60 | lauryl acrylate N-vinylcaprolactam ethylene glycol diacrylate | 8 15 15 | " | 2 | | |
| Rh3 | polymerizable oligomer synthesized from 2-hydroxyethyl acrylate, 2,4-tolylene diisocyanate, and polytetramethylene glycol | 65 | lauryl acrylate N-vinylcaprolactam ethylene glycol diacrylate | 15 13 5 | " | 2 | | |
| Rh4 | polymerizable oligomer synthesized from 2-hydroxyethyl acrylate, 2,4-tolylene diisocyanate, and polytetramethylene glycol | 60 | lauryl acrylate N-vinylcaprolactam ethylene glycol diacrylate | 8 10 20 | " | 2 | | |

EO変成*: Ethylene oxide denaturation

Thus obtained coated optical fiber 4 was taken up by the winder 12 at a tension of 50 g by way of the bottom roller 11.

In this coated optical fiber, the cross-sectional area, Young's modulus, average linear expansion coefficient ($\alpha_a$, linear shrinkage ratio, hardening shrinkage ratio, effective linear expansion coefficient, and FI of each of the first and second UV-curable resin layers was calculated. Also, in thus obtained coated optical fiber, the low-temperature transmission characteristic, microbending, adhesive force between the first UV-curable resin layer and silica glass, and coating removability were studied, the status of occurrence of peeling (resistance to peeling) between the optical fiber and the first UV-curable resin layer and voids in the first UV-curable resin layer (resistance to voids) were observed after a low-temperature test, and a high-tension screening test was carried out. Further, the breaking strength was measured in each of the first and second UV-curable resin layers.

(Calculation of Young's Modulus of UV-Curable Resin Layer)

The Young's modulus of UV-curable resin layers was measured as follows: First, the resin compositions shown in Table 2 were prepared, and were irradiated with UV rays at a dose of 100 mJ/cm² in a nitrogen atmosphere, whereby a sheet having a thickness of 100 μm was obtained. While being shielded from light, thus obtained sheet was left for 24 hours at a temperature of 23° C.±2° C. with an RH of 50±5%, so as to regulate the status of sheet. Subsequently, from this sheet, a test sample in a JIS No. 2 dumbbell shape was prepared and subjected to a tension test with a marked line gap of 25 mm, a chuck gap of 25 mm, and a pulling rate of 50 mm/min, so as to calculate the Young's modulus. The rest was in conformity to JIS K7127. The Young's modulus was calculated at each of temperatures of 23° C. and −40° C. Table 1 shows the results.

In the tension test, the Young's modulus at 23° C. was measured with TENSILON/UTM-3 manufactured by TOYO MEASURING INSTRUMENTS, whereas the Young's modulus at −40° C. was measured with STROGRAPH-T manufactured by TOYOSEIKI SEISAKUSHO, LTD.

(Measurement of Average Linear Expansion Coefficient $\alpha_a$)

For measuring the linear expansion coefficients of the first and second UV-curable resin layers, a film-like test piece (10 μm in thickness×5 mm in width×25 mm in length) made of the same material as that of the first UV-curable resin layer was prepared. Similarly, a film-like test piece made of the same material as that of the second UV-curable resin layer was prepared. In these film-like test pieces, the average linear expansion coefficient $\alpha_a$ ($10^{-6}$/° C.) was measured with TMA (Thermal Mechanical Analyzer). The average linear expansion coefficient $\alpha_a$ ($10^{-6}$/° C.) was calculated as an average value of linear expansion coefficients from −40° C. to 150° C. Table 1 shows the results.

(Calculation of Hardening Shrinkage Ratio s)

During the preparation of coated optical fiber, the specific gravity of the first layer resin composition and that of the first UV-curable resin layer were measured, and the hardening shrinkage ratio s was calculated from the above-mentioned expression (3). Table 1 shows the results.

(Calculation of Linear Shrinkage Ratio s')

Based on the hardening shrinkage ratio s calculated as mentioned above, the linear shrinkage ratio s' was calculated from the above-mentioned expression (2). Table 1 shows the results.

(Low-Temperature Transmission Characteristic)

The low-temperature transmission characteristic was evaluated as follows: The coated optical fiber having a length of 3000 m was wound in a ring having a diameter of about 280 mm and put into a thermostat capable of temperature programming, the water temperature was lowered from 25° C. to −40° C. and then returned to 25° C., which was counted as 1 cycle, and heat-cycling was carried out for 10 cycles. Here, one end of the coated optical fiber was connected to an LED light source at a wavelength of 1.55 μm, whereas the other end was connected to a photodetector, and transmission losses at 25° C. and −40° C. in 10 cycles were measured. Then, the change of transmission loss at −40° C. with respect to that at 25° C. was calculated. The case where the change was greater than 0.000 dB/km was indicated by cross mark, in which it was considered that transmission characteristics could deteriorate in a low temperature environment. The case where the change was within the range of −0.002 dB/km to 0.000 dB/km was indicated by circle mark, in which it was considered that transmission characteristics in a low temperature environment could sufficiently be prevented from deteriorating. The case where the change was smaller than −0.002 dB/km was indicated by double circle mark, in which it was considered that transmission characteristics in a low temperature environment could more effectively be prevented from deteriorating. Table 4 shows the results.

The coating state of the coated optical fiber after the low-temperature transmission characteristic test was verified by immersing the coated optical fiber in a matching oil for refractive index adjustment after the low-temperature transmission characteristic test and then observing the coated optical fiber in a side face direction thereof with an optical microscope under a magnification of 50×. Then, the case where the first UV-curable resin layer was peeled from the optical fiber was indicated by cross mark, in which it was considered that the peeling was likely to occur (there was no

TABLE 4

|  | Total FI | Loss increase upon temperature drop | Loss increase by microbending | Adhesive force (N/m) | Resistance to peeling | Coating removability | Frequency of breaking upon high-tension screening | Breaking strength (MPa) | Resistance to void |
|---|---|---|---|---|---|---|---|---|---|
| Example 1 | 1.9 | ⊚ | ○ | 150 | ○ | ○ | ○ | 6.0 | ○ |
| Example 2 | 1.9 | ⊚ | ○ | 150 | ○ | ○ | ○ | 2.2 | ○ |
| Example 3 | 1.9 | ⊚ | ○ | 150 | ○ | ○ | ○ | 1.1 | x |
| Example 4 | 1.9 | ⊚ | ○ | 250 | ○ | x | ○ | 2.3 | ○ |
| Example 5 | 1.9 | ⊚ | ○ | 50 | ○ | ○ | ○ | 2.1 | ○ |
| Example 6 | 1.9 | ⊚ | ○ | 20 | x | ○ | ○ | 1.8 | ○ |
| Example 7 | 1.6 | ⊚ | ○ | — | — | — | ○ | — | — |
| Example 8 | 2.6 | ○ | ○ | — | — | — | ○ | — | — |

(Evaluation of Microbending)

The transmission loss at a wavelength of 1.55 µm was measured by OTDR in each of the states where the coated optical fiber was wound by a length of 600 m at a tension of 100 g about a bobbin having a shell diameter of about 280 mm wrapped with #1000 sandpaper and where the coated optical fiber having a length of 1000 m was wound into a ring, and the transmission loss in the latter state was subtracted from that in the former state, so as to determine the transmission loss increase. The case where the transmission loss increase was greater than 1 dB/km was indicated by cross mark, in which the microbending was considered unfavorable. The case where the transmission loss increase was greater than 0.5 dB/km but not more than 1 dB/km was indicated by circle mark, in which the microbending was considered favorable. The case where the transmission loss increase was not greater than 0.5 dB/km was indicated by double circle mark, in which the microbending was considered quite favorable. Table 4 shows the results.

(Measurement of Adhesive Force)

The adhesive force between the silica glass and the first UV-curable resin layer was measured as follows: First, a silica glass sheet was immersed in sulfuric acid for at least 5 minutes, so as to cleanse its surface. The first layer resin composition was applied onto thus cleansed silica glass sheet and then was cured upon irradiation with UV rays, whereby a resin sheet having a thickness of 250 µm and a width of 50 mm was formed. Here, the dose of UV irradiation was 100 mJ/cm². Thus obtained resin sheet was left for 1 week in an atmosphere at 25° C. with an RH of 50%. This resin sheet was partially peeled from the silica glass sheet and bent to an angle of 180°, and then was peeled by 50 mm at a pulling rate of 200 mm/min. The rest was in conformity to JIS Z0237. Here, the adhesive force was one in which the maximum value of the force at the time when peeling the resin sheet from the silica glass plate was converted into the value per unit width of the resin sheet. Table 4 shows the results.

(Observation of Status of Occurrence of Peeling Between Optical Fiber and First UV-Curable Resin Layer After Low-Temperature Transmission Characteristic Test)

resistance to peeling) in the low temperature environment. The case where the first UV-curable resin layer was not peeled from the optical fiber was indicated by circle mark, in which it was considered that the peeling was sufficiently hard to occur (there was a resistance to peeling) in the low temperature environment as well. Table 4 shows the results.

(Evaluation of Coating Removability)

For evaluating the coating removability of coated optical fiber, a coated optical fiber ribbon was prepared. For preparing the coated optical fiber ribbon, four coated optical fibers each obtained as mentioned above were arranged in parallel, and coated with a UV-curable resin composition, which was then cured upon irradiation with UV rays, whereby the four coated optical fibers were collectively coated. Used as the UV-curable resin composition was one containing 70% by weight of a polymerizable oligomer synthesized from 2-hydroxyethyl acrylate, 2,4-tolylene diisocyanate, and polypropylene glycol, 28% by weight of N-vinylpyrrolidone as a diluent monomer, and 2% by weight of 2,4,6-trimethylbenzoylphenylphosphine oxide.

The removability of the collective coating in thus obtained coated optical fiber ribbon was evaluated as follows: Namely, the coating on one end of the coated optical fiber ribbon was manually removed at once with a heated remover (JR-4A; manufactured by Sumitomo Electric Industries, Ltd.). The heating temperature of the heater for the heated remover was 90° C. Table 4 shows the results of coating removability at this time. In Table 4, the case where the four glass fibers could be exposed was indicated by circle mark, in which the coating removability of coated optical fiber was considered favorable; whereas the case where the glass fibers could not be exposed was indicated by cross mark, in which the coating removability of coated optical fiber was considered unfavorable.

(Measurement of Breaking Frequency upon High-Tension Screening)

Screening was carried out while applying a tensile tension of 21.6 N to the coated optical fiber, so as to study the breaking frequency of the coated optical fiber. The case where the breaking frequency was 5/1000 km or less was indicated by circle mark, in which breaking was considered hard to occur upon high-tension screening; whereas the other case was indicated by cross mark. Table 4 shows the results.

(Measurement of Breaking Strength)

The breaking strength of the first UV-curable resin layer was determined as follows: The material same as that of the first layer resin composition was applied onto a silica glass substrate, and was cured upon irradiation with UV rays at a dose of 100 mJ/cm$^2$ in a nitrogen atmosphere, whereby a sheet having a thickness of about 100 μm was obtained. The sheet was formed into a JIS No. 2 dumbbell shape. The status of thus obtained sheet was regulated for at least 24 hours at a temperature of 23° C.±2° C. with an RH of 50±5% while being shielded from light. Then, using a tension tester (TENSILON/UTM-3; manufactured by TOYO MEASURING INSTRUMENTS), the sheet was subjected to a tension test with a marked line gap of 25 mm, a chuck gap of 80±5 mm, and a pulling rate of 50 mm/min, until it broke, and the stress at the time of breaking was taken as the breaking strength. The rest in the tension test was in conformity to JIS K7127. Table 4 shows the results.

(Observations of Status of Peeling at Interface Between Optical Fiber and First UV-Curable Resin Layer and Voids in First UV-Curable Resin Layer)

After being subjected to the high-tension screening, the coated optical fiber was reeled out from the take-up bobbin, so as to be immersed in a matching oil for refractive index adjustment, and then a side face thereof was observed under a microscope of 50×, so as to determine the status of peeling and whether voids exist or not. Table 4 shows the results. In Table 4, the case where a void or peeling was seen was indicated by cross mark, in which it was considered that there was no resistance to void; whereas the case where neither void nor peeling was seen was indicated by circle mark, in which it was considered that there was a resistance to void.

EXAMPLES 9 AND 10

A coated optical fiber was made in the same manner as Example 1, 7, or 8, except that the third UV-curable resin layer obtained by the resin compositions listed in Table 5 was further provided on the second UV-curable resin layer, and that the outer diameters of the first to third UV-curable resin layers were set to their respective values shown in Table 5.

TABLE 5

| Example | Layer | Resin composition | Inner diameter [mm] | Outer diameter [mm] | Cross-sectional area [mm$^2$] | Young's modulus 23° C. [MPa] | Young's modulus −40° C. [MPa] | Average linear expansion coefficient $\alpha_a$ (150~ −40° C.) [10$^{-5}$/° C.] | Hardening shrinkage ratio s[−] | Linear shrinkage ratio s'[−] | Effective linear expansion coefficient $\alpha_{eff}$ (150~ −40° C.) [10$^{-5}$/° C.] | Contraction stress index FI [N] | Total FI [N] |
|---|---|---|---|---|---|---|---|---|---|---|---|---|---|
| Example 9 | 1 | Rs2-1 | 0.125 | 0.200 | 0.0191 | 0.7 | 60 | 610 | 0.031 | 0.0104 | 665 | 0.15 | 1.9 |
| | 2 | Rh2 | 0.200 | 0.235 | 0.0120 | 1000 | 2000 | 200 | 0.055 | 0.0187 | 298 | 1.36 | |
| | 3 | Rh4 | 0.235 | 0.245 | 0.0038 | 1200 | 3000 | 100 | 0.050 | 0.0170 | 189 | 0.41 | |
| Example 10 | 1 | Rs2-1 | 0.125 | 0.210 | 0.0224 | 0.7 | 60 | 610 | 0.031 | 0.0104 | 665 | 0.17 | 1.6 |
| | 2 | Rh2 | 0.210 | 0.235 | 0.0087 | 1000 | 2000 | 200 | 0.055 | 0.0187 | 298 | 0.99 | |
| | 3 | Rh4 | 0.235 | 0.245 | 0.0038 | 1200 | 3000 | 100 | 0.050 | 0.0170 | 189 | 0.41 | |
| Example 11 | 1 | Rs1 | 0.125 | 0.200 | 0.0191 | 1200 | 62 | 580 | 0.032 | 0.0108 | 637 | 0.14 | 1.9 |
| | 2 | Rh2 | 0.200 | 0.245 | 0.0157 | 1000 | 2000 | 200 | 0.055 | 0.0187 | 298 | 1.78 | |
| Example 12 | 1 | Rs1 | 0.125 | 0.210 | 0.0224 | 1200 | 62 | 580 | 0.032 | 0.0108 | 637 | 0.17 | 1.6 |
| | 2 | Rh2 | 0.210 | 0.245 | 0.0125 | 1000 | 2000 | 200 | 0.055 | 0.0187 | 298 | 1.42 | |

TABLE 6

| Example | Layer | Resin composition | Inner diameter [mm] | Outer diameter [mm] | Cross-sectional area [mm$^2$] | Young's modulus 23° C. [MPa] | Young's modulus −40° C. [MPa] | Average linear expansion coefficient $\alpha_a$ (150~ −40° C.) [10$^{-5}$/° C.] | Hardening shrinkage ratio s[−] | Linear shrinkage ratio s'[−] | Effective linear expansion coefficient $\alpha_{eff}$ (150~ −40° ) [10$^{-5}$/° C.] | Contraction stress index FI [N] | Total FI [N] |
|---|---|---|---|---|---|---|---|---|---|---|---|---|---|
| Example 13 | 1 | Rs1 | 0.125 | 0.200 | 0.0191 | 1200 | 62 | 580 | 0.032 | 0.0108 | 637 | 0.14 | 1.9 |
| | 2 | Rh2 | 0.200 | 0.235 | 0.0120 | 1000 | 2000 | 200 | 0.055 | 0.0187 | 298 | 1.36 | |
| | 3 | Rh4 | 0.235 | 0.245 | 0.0038 | 1200 | 3000 | 100 | 0.050 | 0.0170 | 189 | 0.41 | |
| Example 14 | 1 | Rs3 | 0.125 | 0.210 | 0.0224 | 0.3 | 50 | 650 | 0.031 | 0.0104 | 705 | 0.15 | 0.6 |
| | 2 | Rh3 | 0.210 | 0.245 | 0.0125 | 150 | 600 | 190 | 0.057 | 0.0194 | 292 | 0.42 | |
| Example 15 | 1 | Rs3 | 0.125 | 0.210 | 0.0224 | 0.3 | 50 | 650 | 0.031 | 0.0104 | 705 | 0.15 | 0.8 |
| | 2 | Rh3 | 0.210 | 0.235 | 0.0087 | 150 | 600 | 190 | 0.057 | 0.0194 | 292 | 0.29 | |
| | 3 | Rh4 | 0.235 | 0.245 | 0.0038 | 1200 | 3000 | 100 | 0.050 | 0.0170 | 189 | 0.41 | |

TABLE 6-continued

| Example | Layer | Resin composition | Inner diameter [mm] | Outer diameter [mm] | Cross-sectional area [mm²] | Young's modulus 23° C. [MPa] | Young's modulus −40° C. [MPa] | Average linear expansion coefficient $\alpha_a$ −40° C.) [10⁻⁵/° C.] | Hardening shrinkage ratio s[−] | Linear shrinkage ratio s'[−] | Effective linear expansion coefficient $\alpha_{eff}$ (150~ −40°) [10⁻⁵/° C.] | Contraction stress index FI [N] | Total FI [N] |
|---|---|---|---|---|---|---|---|---|---|---|---|---|---|
| Example 16 | 1 | Rs3 | 0.125 | 0.200 | 0.0191 | 0.3 | 50 | 650 | 0.031 | 0.0104 | 705 | 0.13 | 1.0 |
|  | 2 | Rh3 | 0.200 | 0.235 | 0.0120 | 150 | 600 | 190 | 0.057 | 0.0194 | 292 | 0.40 |  |
|  | 3 | Rh2 | 0.235 | 0.245 | 0.0038 | 1000 | 2000 | 200 | 0.055 | 0.0187 | 298 | 0.43 |  |
| Comparative Example 1 | 1 | Rs2-1 | 0.125 | 0.180 | 0.0132 | 0.7 | 60 | 610 | 0.031 | 0.0104 | 665 | 0.10 | 3.4 |
|  | 2 | Rh1 | 0.180 | 0.245 | 0.0217 | 1500 | 2600 | 205 | 0.060 | 0.0204 | 312 | 3.35 |  |

In this coated optical fiber, the cross-sectional area, Young's modulus, average linear expansion coefficient $\alpha_a$, linear shrinkage ratio, hardening shrinkage ratio, and effective linear expansion coefficient $\alpha_{eff}$ in each of the first to third UV-curable resin layers were calculated as in Example 1, 7, or 8. Then, the respective contraction stress indices FI of the individual layers, and their sum were determined. Table 5 shows the results.

Further, thus obtained coated optical fiber was studied in terms of low-temperature transmission and microbending, and was subjected to a high-tension screening test. Table 7 shows the results.

TABLE 7

|  | Total FI | Loss increase upon temperature drop | Loss increase by microbending | Frequency of breaking upon high-tension screening |
|---|---|---|---|---|
| Example 9 | 1.9 | ◎ | ◎ | ○ |
| Example 10 | 1.6 | ◎ | ◎ | ○ |
| Example 11 | 1.9 | ◎ | x | ○ |
| Example 12 | 1.6 | ◎ | x | ○ |
| Example 13 | 1.9 | ◎ | x | ○ |
| Example 14 | 0.6 | ◎ | ○ | x |
| Example 15 | 0.8 | ◎ | ◎ | ○ |
| Example 16 | 1.0 | ◎ | ○ | ○ |
| Comparative Example | 3.4 | x | ◎ | ○ |

EXAMPLE 11

Coated optical fibers were made in the same manner as Examples 1 to 6 except that Rs1 was used in place of Rs2-1.

In these coated optical fibers, the cross-sectional area, Young's modulus, average linear expansion coefficient $\alpha_a$, linear shrinkage ratio, hardening shrinkage ratio, and effective linear expansion coefficient $\alpha_{eff}$ in each of the first and second UV-curable resin layers were calculated as in Examples 1 to 6. Then, the respective contraction stress indices FI of the individual layers, and their sum were determined. Table 5 shows the results.

Further, thus obtained coated optical fibers were studied in terms of low-temperature transmission and microbending, and were subjected to a high-tension screening test. Table 7 shows the results.

EXAMPLE 12

Two kinds of coated optical fibers were made in the same manner as Example 7 except that Rs1 was used as the first layer resin composition.

In these coated optical fibers, the cross-sectional area, Young's modulus, average linear expansion coefficient $\alpha_a$, linear shrinkage ratio, hardening shrinkage ratio, and effective linear expansion coefficient $\alpha_{eff}$ in each of the first and second UV-curable resin layers were calculated as in Example 7. Then, the respective contraction stress indices FI of the individual layers, and their sum were determined. Table 5 shows the results.

Further, thus obtained coated optical fibers were studied in terms of low-temperature transmission and microbending, and were subjected to a high-tension screening test. Table 7 shows the results.

EXAMPLE 13

A coated optical fiber was made in the same manner as Example 9 except that Rs1 was used in place of Rs2-1 as the first layer resin composition.

In this coated optical fiber, the cross-sectional area, Young's modulus, average linear expansion coefficient $\alpha_a$, linear shrinkage ratio, hardening shrinkage ratio, and effective linear expansion coefficient $\alpha_{eff}$ in each of the first to third UV-curable resin layers were calculated as in Example 9. Then, the respective contraction stress indices FI of the individual layers, and their sum were determined. Table 6 shows the results.

Further, thus obtained coated optical fiber was studied in terms of low-temperature transmission and microbending, and was subjected to a high-tension screening test. Table 7 shows the results.

EXAMPLE 14

A coated optical fiber was made in the same manner as Example 7 except that Rs3 was used in place of Rs2-1 as the first layer resin composition, and that Rh3 was used in place of Rh2 as the second layer resin composition.

In this coated optical fiber, the cross-sectional area, Young's modulus, average linear expansion coefficient $\alpha_a$, linear shrinkage ratio, hardening shrinkage ratio, and effective linear expansion coefficient $\alpha_{eff}$ in each of the first and second UV-curable resin layers were calculated as in Example 7. Then, the respective contraction stress indices FI of the individual layers, and their sum were determined. Table 6 shows the results.

Further, thus obtained coated optical fiber was studied in terms of low-temperature transmission and microbending, and was subjected to a high-tension screening test. Table 7 shows the results.

EXAMPLE 15

Coated optical fibers were made in the same manner as Example 10 except that those shown in Table 6 were used as the first to third layer resin compositions.

In these coated optical fibers, the cross-sectional area, Young's modulus, average linear expansion coefficient $\alpha_a$, linear shrinkage ratio, hardening shrinkage ratio, and effective linear expansion coefficient $\alpha_{eff}$ in each of the first to third UV-curable resin layers were calculated as in Example 10. Then, the respective contraction stress indices FI of the individual layers, and their sum were determined. Table 6 shows the results.

Further, thus obtained coated optical fibers were studied in terms of low-temperature transmission and microbending, and were subjected to a high-tension screening test. Table 7 shows the results.

EXAMPLE 16

Coated optical fibers were made in the same manner as Examples 9 and 13 except that those shown in Table 6 were used as the first to third resin compositions.

In these coated optical fibers, the cross-sectional area, Young's modulus, average linear expansion coefficient $\alpha_a$, linear shrinkage ratio, hardening shrinkage ratio, and effective linear expansion coefficient $\alpha_{eff}$ in each of the first to third UV-curable resin layers were calculated as in Examples 9 and 13. Then, the respective contraction stress indices FI of the individual layers, and their sum were determined. Table 6 shows the results.

Further, thus obtained coated optical fibers were studied in terms of low-temperature transmission and microbending, and were subjected to a high-tension screening test. Table 7 shows the results.

COMPARATIVE EXAMPLE 1

A coated optical fiber was made in the same manner as Example 8 except that Rh1 was used in place of Rh2 as the second layer resin composition.

In this coated optical fiber, the cross-sectional area, Young's modulus, average linear expansion coefficient $\alpha_a$, linear shrinkage ratio, hardening shrinkage ratio, and effective linear expansion coefficient $\alpha_{eff}$ in each of the first and second UV-curable resin layers were calculated as in Example 8. Then, the respective contraction stress indices FI of the individual layers, and their sum were determined. Table 6 shows the results.

Further, thus obtained coated optical fiber was studied in terms of low-temperature transmission and microbending, and was subjected to a high-tension screening test. Table 7 shows the results.

EXAMPLES 17 TO 19

A coated optical fiber was made in the same manner as Example 1, 7, or 8 except that Rs2-0 in Table 8 was used in place of Rs2-1 as the first layer resin composition, that Rh2-0 in Table 8 was used in place of Rh2 as the second layer resin composition, and that the inner and outer diameters of the first and second UV-curable resin layers were set to their respective values shown in Table 9. In Table 8, the substances listed in the column of "urethane acrylate" indicate the materials for urethane acrylate, whereas the molar ratios indicate those of these materials. Further, "part" refers to the part of urethane acrylate.

TABLE 8

| Resin composition | Urethane acrylate (oligomer) | molar ratio | part | Monomer | part | Photoinitiator | part |
|---|---|---|---|---|---|---|---|
| Rs2-0 | polyether diol (molecular weight: 7000) | 2 | 65 | isobornyl acrylate | 14 | Lucirin TPO | 1.5 |
|  |  |  |  | N-vinylcaprolactam | 8 |  |  |
|  |  |  |  | nonylphenol acrylate | 8 |  |  |
|  | isophorone diisocyanate | 3 |  | nonanediol | 2 |  |  |
|  | hydroxyethyl acrylate | 2 |  |  |  |  |  |
| Rh2-0 | ethylene-oxide-added diol of bisphenol-A | 1 | 15 | isobornyl acrylate | 13 | Lucirin TPO | 1.5 |
|  |  |  |  | isobornyl acrylate | 10 |  |  |
|  | isophorone diisocyanate | 2 |  | diacrylate of ethylene-oxide-added diol of bisphenol-A | 20 |  |  |
|  | hydroxyethyl acrylate | 2 |  |  |  |  |  |
|  | polytetramethylene glycol | 1 | 30 |  |  |  |  |
|  | isophorone diisocyanate | 2 |  |  |  |  |  |
|  | hydroxyethyl acrylate | 2 |  |  |  |  |  |
|  | isophorone diisocyanate | 1 | 10 |  |  |  |  |
|  | hydroxyethyl acrylate | 2 |  |  |  |  |  |

| Resin composition | Silane coupling agent | part | Antioxidant | part |
|---|---|---|---|---|
| Rs2-0 | γ-mercapto propyltrimethoxysilane | 1 | 3,9-bis[2-{3-(3-tert-butyl-4-hydroxy-5-methylphenyl)propyonyloxy}-1,1-dimethylethyl]-2,4,8,10-tetraoxaspiro[5,5]-undecane | 0.5 |
| Rh2-0 | — |  | 3,9-bis[2-{3-(3-tert-butyl-4-hydroxy-5-methylphenyl)propyonyloxy}-1,1-dimethylethyl]-2,4,8,10-tetraoxaspiro[5,5]-undecane | 0.5 |

TABLE 9

| Example | Layer | Resin composition | Inner diameter [mm] | Outer diameter [mm] | Cross-sectional area [mm²] | Young's modulus 23° C. [MPa] | Young's modulus −40° C. [MPa] | Average linear expansion coefficient $\alpha_a$ (150~ −40° C.) [$10^{-5}$/° C.] | Hardening shrinkage ratio s[−] | Linear shrinkage ratio s'[−] | Effective linear expansion coefficient $\alpha_{eff}$ (150~ −40°) [$10^{-5}$/° C.] | Contraction stress index FI [N] | Total FI [N] |
|---|---|---|---|---|---|---|---|---|---|---|---|---|---|
| Example 17 | 1 | Rs2-0 | 0.125 | 0.180 | 0.0132 | 0.7 | 48 | 600 | 0.036 | 0.0121 | 664 | 0.08 | 2.27 |
| | 2 | Rh2-0 | 0.180 | 0.245 | 0.0217 | 882 | 1862 | 190 | 0.053 | 0.0180 | 285 | 2.19 | |
| Example 18 | 1 | Rs2-0 | 0.125 | 0.200 | 0.0191 | 0.7 | 48 | 600 | 0.036 | 0.0121 | 664 | 0.12 | 1.70 |
| | 2 | Rh2-0 | 0.200 | 0.245 | 0.0157 | 882 | 1862 | 190 | 0.053 | 0.0180 | 285 | 1.58 | |
| Example 19 | 1 | Rs2-0 | 0.125 | 0.210 | 0.0224 | 0.7 | 48 | 600 | 0.036 | 0.0121 | 664 | 0.14 | 1.40 |
| | 2 | Rh2-0 | 0.210 | 0.245 | 0.0125 | 882 | 1862 | 190 | 0.053 | 0.0180 | 285 | 1.26 | |
| Example 20 | 1 | Rs2-0 | 0.125 | 0.200 | 0.0191 | 0.7 | 48 | 600 | 0.036 | 0.0121 | 664 | 0.12 | 1.73 |
| | 2 | Rh2-0 | 0.200 | 0.235 | 0.0120 | 882 | 1862 | 190 | 0.053 | 0.0180 | 285 | 1.20 | |
| | 3 | Rh4 | 0.235 | 0.245 | 0.0038 | 1200 | 3000 | 100 | 0.050 | 0.0170 | 189 | 0.41 | |
| Example 21 | 1 | Rs2-0 | 0.125 | 0.210 | 0.0224 | 0.7 | 48 | 600 | 0.036 | 0.0121 | 664 | 0.14 | 1.43 |
| | 2 | Rh2-0 | 0.210 | 0.235 | 0.0087 | 882 | 1862 | 190 | 0.053 | 0.0180 | 285 | 0.88 | |
| | 3 | Rh4 | 0.235 | 0.245 | 0.0038 | 1200 | 3000 | 100 | 0.050 | 0.0170 | 189 | 0.41 | |

TABLE 10

| | Total FI | Loss increase upon temperature drop | Loss increase by microbending | Adhesive force (N/m) | Coating removability | Frequency of breaking upon high-tension screening | Resistance to void |
|---|---|---|---|---|---|---|---|
| Example 17 | 2.27 | ⊚ | ○ | 100 | ○ | ○ | ○ |
| Example 18 | 1.70 | ⊚ | ○ | 100 | ○ | ○ | ○ |
| Example 19 | 1.40 | ⊚ | ○ | 100 | ○ | ○ | ○ |
| Example 20 | 1.73 | ⊚ | ⊚ | — | — | ○ | — |
| Example 21 | 1.43 | ⊚ | ⊚ | — | — | ○ | — |

In this coated optical fibers, the cross-sectional area, Young's modulus, average linear expansion coefficient $\alpha_a$, linear shrinkage ratio, hardening shrinkage ratio, and effective linear expansion coefficient $\alpha_{eff}$ in each of the first and second UV-curable resin layers were calculated as in Example 1, 7, or 8. Then, the respective contraction stress indices FI of the individual layers, and their sum were determined. Table 9 shows the results.

Further, thus obtained coated optical fiber was studied in terms of low-temperature transmission and microbending characteristics, and was subjected to a high-tension screening test. Table 10 shows the results.

EXAMPLES 20 AND 21

A coated optical fiber 4 was made in the same manner as Examples 17 to 19 except that the third TV-curable resin layer obtained from the resin composition Rh4 in Table 3 was further provided on the second UV-curable resin layer, and that the inner and outer diameters of the first to third UV-curable resin layers were set to their respective values shown in Table 7.

In this coated optical fiber 4, the cross-sectional area, Young's modulus, average linear expansion coefficient $\alpha_a$, linear shrinkage ratio, hardening shrinkage ratio, and effective linear expansion coefficient $\alpha_{eff}$ in each of the first to third UV-curable resin layers were calculated as in Examples 17 to 19. Then, the respective contraction stress indices FI of the individual layers, and their sum were determined. Table 9 shows the results.

Further, as in Examples 17 to 19, thus obtained coated optical fiber 4 was studied in terms of low-temperature transmission and microbending, and was subjected to a high-tension screening test. Table 10 shows the results.

EXAMPLE 22

A coated optical fiber was made in the following manner by a manufacturing apparatus equipped with a swinging guide roller shown in FIG. 5.

Figure 5:
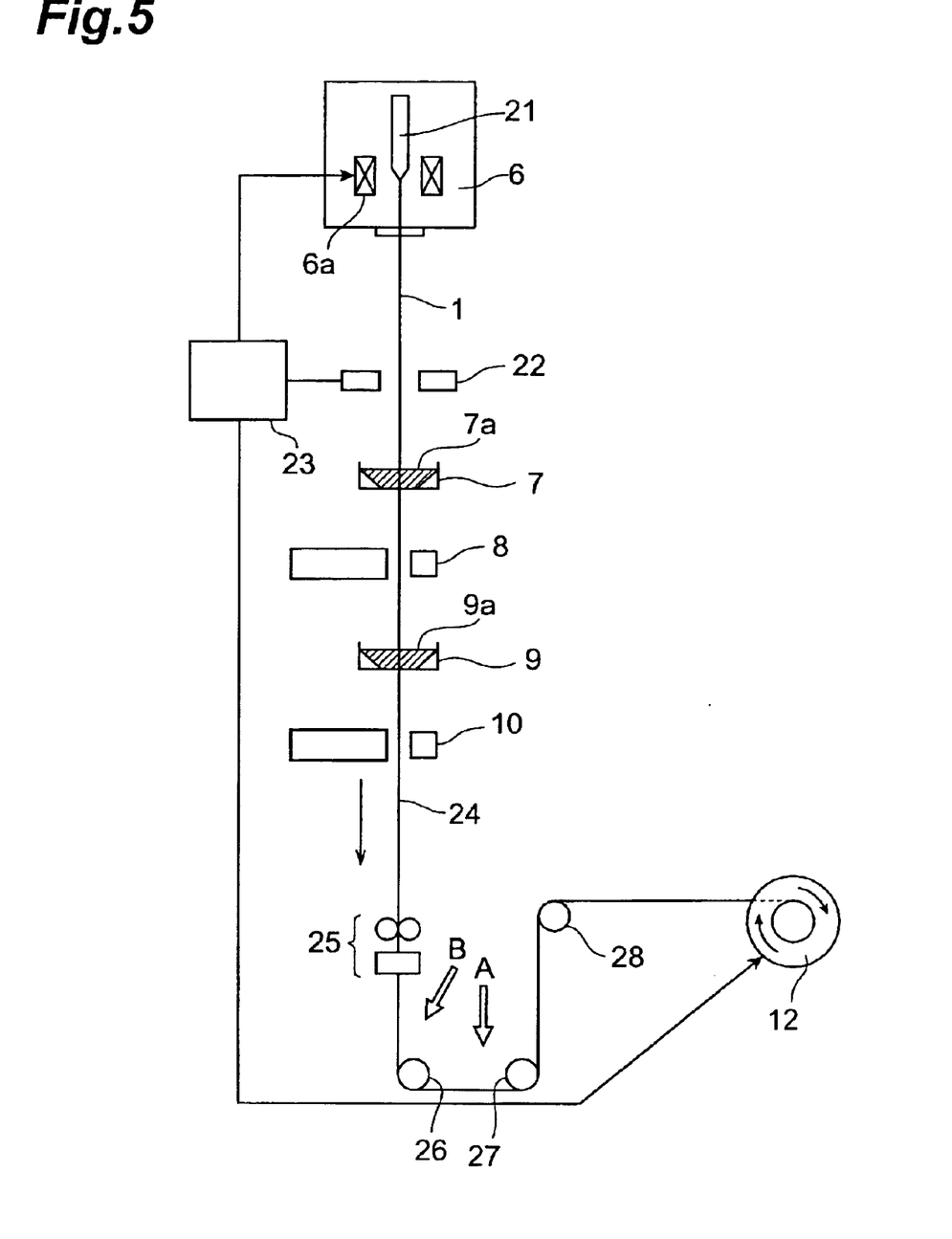
FIG. 5 is a schematic view showing another example of drawing apparatus for making coated optical fibers in accordance with Examples 22 and 23.

FIG. 5 is a schematic view showing the apparatus for making a coated optical fiber used in this example, illustrating the process until the glass optical fiber drawn from an optical fiber preform is taken up by a winder. In FIG. 5, 22 refers to a laser outer diameter meter, 23 a drawing controller, 7a a first layer resin composition, 9a a second layer resin composition, 24 a coated optical fiber, 25 a guide roller, 26 a swinging guide roller, and 27, 28 fixed guide rollers. Here, constituents identical or equivalent to those in FIG. 2 were referred to with numerals identical thereto.

An optical fiber preform 21 was set in the drawing furnace 6, so that the front end of the optical fiber preform 21 was inserted in the drawing furnace 6 heated at 1950° C. by the heater 6a and drawn upon melting, whereby a glass optical fiber 1 was obtained. The glass optical fiber 1 was made as a dispersion-shifted fiber having a double core type refractive index profile, an effective area of 85 $\mu m^2$, and an outer diameter of 125 $\mu m$. The drawing rate was 100 m/min.

The outer diameter of the drawn glass optical fiber 1 was measured by the laser outer diameter meter 22. The result of measurement of the outer diameter of glass optical fiber 1 was fed back to the drawing controller 23, and the heating temperature of the heater 6a and the drawing rate of the glass optical fiber 1 were regulated so as to attain a desirable outer diameter.

Then, the glass optical fiber 1 drawn to a predetermined outer diameter was passed through the die 7 containing the first layer resin composition 7a, so as to be coated with the first layer resin composition 7a, which was then cured upon irradiation with UV rays in the first UV irradiating unit 8. Thus, the first UV-curable resin layer was formed on the optical fiber 1.

Subsequently, the optical fiber formed with the first UV-curable resin layer was passed through the die 9 containing the second layer resin composition 9a, so as to be coated with the second layer resin composition 9a, which was then cured upon irradiation with UV rays in the second UV irradiating unit 10. Thus, two layers of UV-curable resin were formed on the glass optical fiber 1, whereby the coated optical fiber 24 was obtained.

Used as the first layer resin composition was one in which the amount of multifunctional monomer (nonanediol diacrylate) was adjusted in the composition of Rs2-0 shown in Table 8, whereas Rh2-0 shown in Table 8 was used as the second layer resin composition. As the UV lamps in the UV irradiating units 8, 10, metal halide lamps were used.

Thus obtained coated optical fiber 24 was taken up by the winder 12 by way of the guide roller 25, swinging guide roller 26, and fixed guide rollers 27, 28.

Figure 6:
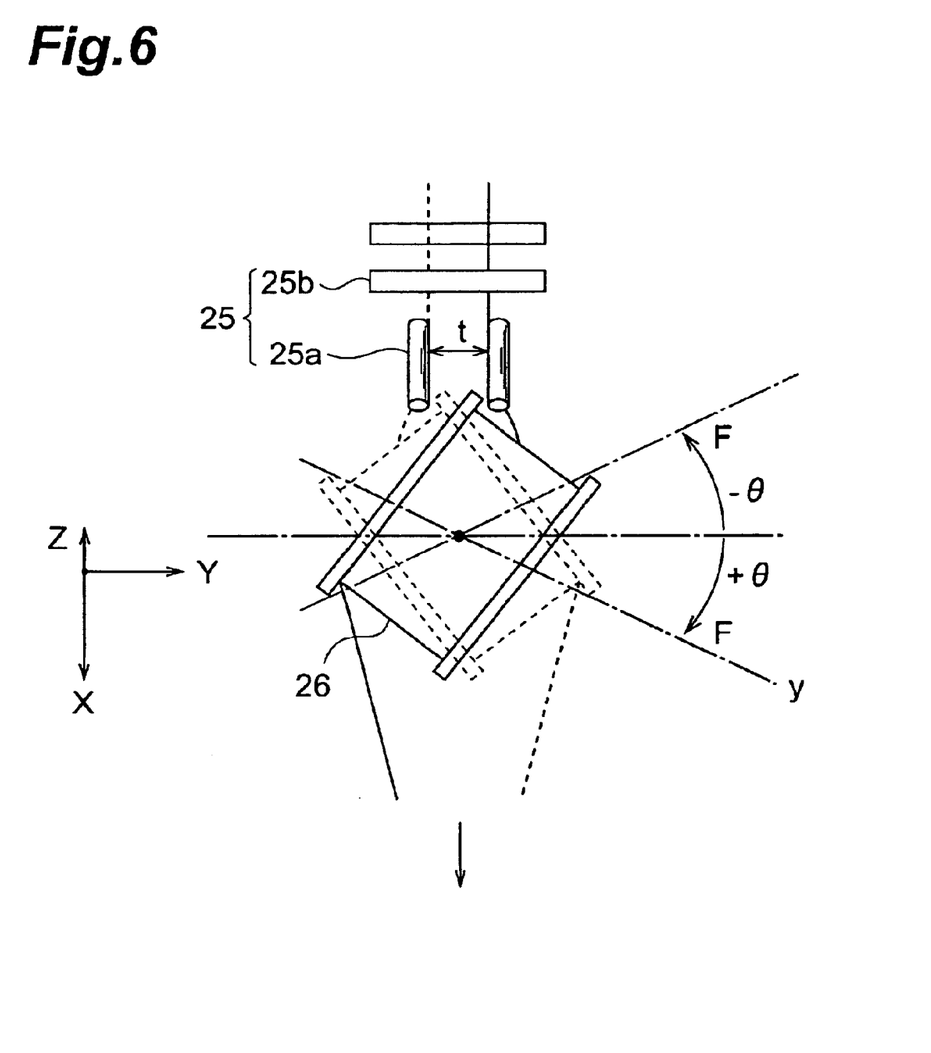
FIG. 6 is a view for explaining a positional relationship between the guide roller and swinging guide roller in FIG. 5.

When passing through the guide roller 25, the coated optical fiber 24 was guided through a gap (about 2 mm) between a roller pair 25a, and a gap (about 2 mm) between a roller pair 25b as shown in FIG. 6.

Figure 7:
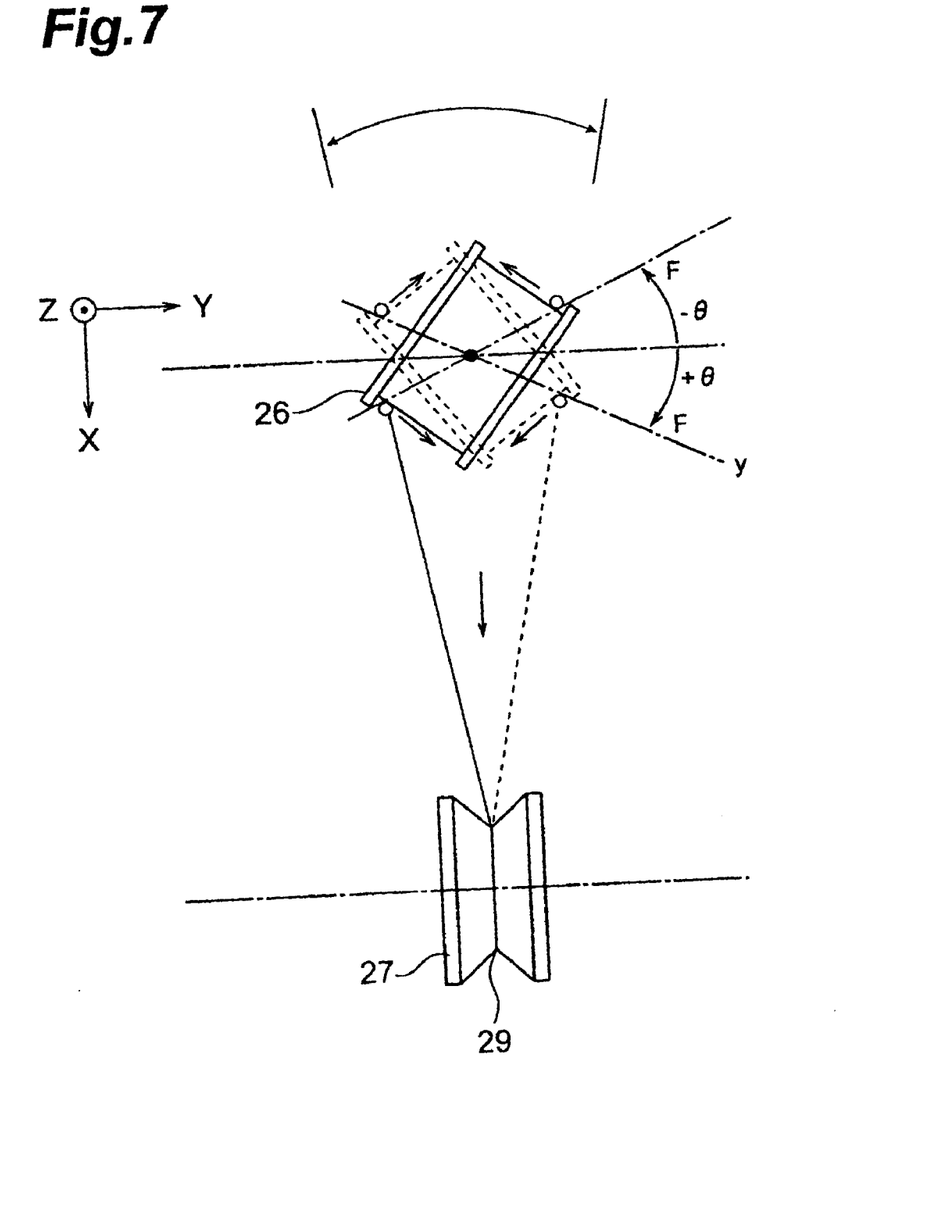
FIG. 7 is a view for explaining a positional relationship between the swinging guide roller and fixed guide roller.

Also, the coated optical fiber 24 was alternately twisted along its moving direction as follows:

Namely, as shown in FIG. 7, the rotary axis y of the swinging guide roller 26 was pivoted to +θ about the drawing direction axis z, so as to impart a lateral force to the coated optical fiber 24, thereby rotating the coated optical fiber 24 on the surface of the swinging guide roller 26, which provided the coated optical fiber 24 with a twist. Subsequently, the swinging guide roller 26 was pivoted in the opposite direction to −θ, so that the coated optical fiber 24 rotated on the surface of the swinging guide roller 26 in the opposite direction. Thus, the swinging guide roller 26 was repeatedly pivoted from +θ to −θ, whereby the coated optical fiber 24 was alternately provided with clockwise and counterclockwise twists with respect to the moving direction thereof. In this case, the drawing tension T of the glass optical fiber 1 was 2.5 (N/fiber), the radius R of swinging guide roller was 0.08 (m), T/R was 31.3, and the number of pivotal swings was 1.67 ($s^{-1}$), each being made constant. Here, the number of pivotal swings was indicated by the number of pivotal movements of the swinging guide roller per second, one pivotal movement being one cycle from +θ to −θ and then from −θ to +θ.

Reference number 29 is a V-shaped groove for preventing the coated optical fiber 24 from rotating on the surface of the roller 27.

In thus obtained coated optical fiber 24, the cross-sectional area, Young's modulus, average linear expansion coefficient $\alpha_a$, linear shrinkage ratio, hardening shrinkage ratio, effective linear expansion coefficient, and FI in each of the first and second UV-curable resin layers were calculated. The results were the same as those in Example 17.

Also, as in Examples 1 to 8, thus obtained coated optical fiber 24 was studied in terms of low-temperature transmission and microbending, and was subjected to a high-tension screening test. Their results were the same as those in Example 17. Further, the breaking strength of the first UV-curable resin layer was measured and found to be 4.0 MPa.

Furthermore, thus obtained optical fiber 24 was evaluated in terms of the occurrence of voids and the peeling between the glass optical fiber and the first UV-curable resin layer at their interface. Table 11 shows the results. In Table 11, the criteria for determining the occurrences of voids and peeling were the same as those in Examples 1 to 8.

TABLE 11

Tension upon drawing T: 2.5 (N/fiber),
Roller radius R: 0.08/(m), T/R: 31.3, Number of pivotal swings: 1.67 ($S^{-1}$)

| | Breaking strength of coating (MPa) | Young's modulus of coating (MPa) | | Void | Peeling |
|---|---|---|---|---|---|
| | | $1^{st}$ layer | $2^{nd}$ layer | | |
| Example 22 | 4.0 | 0.4 | 900 | ○ | ○ |
| Example 23 | 2.0 | 0.4 | 900 | × | ○ |

When the PMD value of the coated optical fiber 24 was measured, the measured value was 0.2 ps/km$^{1/2}$ or less, thus being favorable. The microbending loss increase was 1 dB/km or less, and the frequency of breaking upon screening was 5/1000 km or less, each being "good".

EXAMPLE 23

A coated optical fiber 24 was obtained in the same manner as Example 22 except that the amount of multifunctional monomer (nonanediol diacrylate) in the composition of Rs2-0 shown in Table 8 was adjusted so as to lower the breaking strength of the first UV-curable resin layer to 2.0 MPa.

In thus obtained coated optical fiber 24, the cross-sectional area, Young's modulus, average linear expansion coefficient $\alpha_a$, linear shrinkage ratio, hardening shrinkage ratio, effective linear expansion coefficient, and FI in each of the first and second UV-curable resin layers were calculated. The results were the same as those in Example 22.

Also, as in Examples 1 to 8, thus obtained coated optical fiber 24 was studied in terms of low-temperature transmission and microbending, and was subjected to a high-tension screening test. Their results were the same as those in Example 22.

Furthermore, thus obtained optical fiber 24 was evaluated in terms of the occurrence of voids and the peeling between the glass optical fiber and the first UV-curable resin layer at their interface. Table 11 shows the results.

When the PMD value of the coated optical fiber 24 was measured, the measured value was 0.2 ps/km$^{1/2}$ or less, thus being favorable in this Example as well. The microbending loss increase was 1 dB/km or less, and the frequency of breaking upon screening was 5/1000 km or less, each being "good".

From the foregoing results of Examples 1 to 23 and Comparative Example 1, the following were found. Namely, it was found that Examples 1 to 23 yielded the total FI of 3 [N] or less, thus sufficiently being able to prevent transmission loss from increasing in a low temperature environment, whereas Comparative Example 1 yielded the total FI exceeding 3 [N], thus failing to prevent transmission loss from increasing in a low temperature environment sufficiently.

It was also found that the microbending became better when the Young's modulus of the first UV-curable resin layer at 23° C. was 0.7 MPa or less.

Further, when Examples 9, 10, and 15 were compared with Example 16, it was found that, when the Young's modulus of the second UV-curable resin layer at 23° C. was 150 to 1000 MPa while the Young's modulus of the third UV-curable resin layer at 23° C. was greater than 1000 MPa but not more than 1500 MPa, the microbending further improved, the frequency of breaking upon high-tension screening became lower, and breaking was harder to occur due to external damages.

Also, from Examples 1 to 6, it was found that, when the adhesive force between the first UV-curable resin layer and the optical fiber was 50 to 200 N/m, peeling could sufficiently be prevented from occurring after a low-temperature transmission characteristic test.

Further, it was found that, when the breaking strength of the first UV-curable resin layer was 1.8 MPa or higher, voids could sufficiently be kept from occurring in the UV-curable resin layer, whereby transmission loss could sufficiently be restrained from increasing in a low temperature environment due to the occurrence of voids.

Furthermore, when Examples 22 and 23 were compared with each other, it was found that voids were likely to occur within the coating if the breaking strength of the first UV-curable resin layer was less than 4.0 (MPa). Therefore, it was found that the breaking strength of the first UV-curable resin layer was preferably 4.0 (MPa) or higher.

INDUSTRIAL APPLICABILITY

As explained in the foregoing, the coated optical fiber of the present invention and the coated optical fiber ribbon and optical fiber unit using the same can sufficiently prevent transmission loss from increasing at a low temperature, and can practically be used in submarine or land optical communications in a low temperature environment.

What is claimed is:

1. A coated optical fiber comprising a silica type glass optical fiber coated with n layers (n being an integer of 2 or greater) of UV-curable resin;

wherein the sum of respective contraction stress indices FI defined in said n layers of UV-curable resin by the following expression:

FI [N]=(Young's modulus [MPa] of the UV-curable resin layer at −40° C.)×(cross-sectional area [mm$^2$] of the UV-curable resin layer)×(effective linear expansion coefficient [10$^{-6}$/° C.]/10$^6$)× (temperature difference 190[° C.])

is 3 [n] or less.

2. A coated optical fiber according to claim 1, wherein the first UV-curable resin layer adhered to said silica type glass optical fiber in said n layers of UV-curable resin has a Young's modulus of 0.7 MPa or less at 23° C.

3. A coated optical fiber according to claim 1, wherein the first UV-curable resin layer in said n layers of UV-curable resin and said silica type glass have an adhesive force of 50 to 200 N/m therebetween.

4. A coated optical fiber according to claim 1, wherein the first UV-curable resin layer in said n layers of UV-curable resin has a breaking strength of at least 1.8 MPa.

5. A coated optical fiber according to claim 1, wherein n is 3, the second UV-curable resin layer among the three layers of UV-curable resin having a Young's modulus of 150 to 1000 MPa at 23° C., the third UV-curable resin layer having a Young's modulus greater than 1000 MPa but not more than 1500 MPa at 23° C.

6. A coated optical fiber according to claim 1, wherein the first UV-curable resin layer in said n layers of UV-curable resin is obtained by curing a resin composition containing:

an oligomer having a molecular weight of at least 5000;

a multifunctional monomer having a methylene group with a carbon number of 5 to 11; and a monomer having a heterocycle and/or a monomer having a multi-membered ring, said multifunctional monomer having a weight ratio of 0.02 to 0.04 with respect to said oligomer;

wherein said first UV-curable resin layer has a breaking strength of at least 4.0 MPa.

7. A coated optical fiber according to claim 1, wherein said silica type glass optical fiber is a dispersion-shifted fiber having an effective core area of at least 60 μm$^2$.

8. A coated optical fiber according to claim 1, wherein said silica type glass optical fiber is a negative dispersion fiber; and wherein the ratio (S/D) between chromatic dispersion D and dispersion slope S in said silica type glass optical fiber at a given wavelength within the wavelength range of 1.52 to 1.62 μm is 0.001 to 0.004 (1/nm).

9. A coated optical fiber according to claim 1, wherein said silica type glass optical fiber is a negative dispersion fiber; and wherein the ratio (S/D) between chromatic dispersion D and dispersion slope S in said silica type glass optical fiber at a given wavelength within the wavelength range of 1.52 to 1.62 μm is 0.004 to 0.020 (1/nm).

10. A coated optical fiber according to claim 1, wherein said n layers of UV-curable resin were coated with a coloring layer.

11. A coated optical fiber ribbon comprising a plurality of coated optical fibers according to one of claims 1 to 10.

12. An optical fiber unit comprising:

a central tension member; and a plurality of coated optical fibers arranged about said central tension member;

wherein said coated optical fibers comprise the coated optical fiber according to one of claims 1 to 10.

* * * * *